United States Patent [19]

Fields

[11] Patent Number: 4,702,975
[45] Date of Patent: Oct. 27, 1987

[54] SPARE BATTERY HOLDER FOR A BATTERY-OPERATED DEVICE

[76] Inventor: Roy Fields, 51 Thompson St., Tuckahoe, N.Y. 10707

[21] Appl. No.: 2,737

[22] Filed: Jan. 12, 1987

[51] Int. Cl.[4] ............................................. H01M 2/10
[52] U.S. Cl. ...................................................... 429/100
[58] Field of Search .................... 429/100, 96, 97, 98, 429/121, 122, 1

[56] References Cited

U.S. PATENT DOCUMENTS

| | | | |
|---|---|---|---|
| 1,576,700 | 3/1926 | Zieschang | 429/97 X |
| 2,083,594 | 6/1937 | Brethen | 429/100 X |
| 2,166,657 | 7/1939 | Evelyn | 429/96 X |
| 2,478,887 | 8/1949 | Nelson | 429/100 X |
| 2,522,660 | 9/1950 | Bledsoe, Jr. | 429/96 X |
| 2,590,804 | 3/1952 | Vitale | 429/97 |
| 4,495,257 | 1/1985 | Engelstein et al. | 429/100 |

*Primary Examiner*—Anthony Skapars
*Attorney, Agent, or Firm*—Myron Amer

[57] ABSTRACT

A spare battery holder is provided having a clip of a spring-construction material adapted to engage over the exterior of the electronic device. A battery holder, attached to the clip is provided with upper and lower lateral extensions having gripping means thereon in facing relationship. One of the lateral extensions is provided with a small diameter hole adapted to receive the positive electrical anode contact of the battery while the opposite lateral extension is provided with a spring adapted to bear against the flat negative electrical cathode. The spare battery is then compressed between the two lateral extensions.

4 Claims, 6 Drawing Figures

SPARE BATTERY HOLDER FOR A BATTERY-OPERATED DEVICE

BACKGROUND OF THE INVENTION

The present invention relates to a holder for storing a spare battery in conjunction with a battery-operated device in which the spare battery is ultimately to be used.

Various types of portable and pocket-size electronic equipment such as radios, beepers, and the like are widely used among doctors, hospital personnel, policemen, and other highly mobile persons who must be in relatively constant touch with their offices or collegues. Because the electronic equipment must be always in proper working order it is most annoying and frustrating when the batteries used in the electronic device die or become exhausted, while the user is in the "field" and away from a source or supply for replacement. Generally this occurs at the least opportune or desirable time, and the user is required to scurry madly about finding even a temporary replacement to retain continuity of service and avoid fatal error.

While the batteries used for such electronic devices are themselves relatively small, it is not advantageous to carry spare batteries in one's pocket or elsewhere on the person since they create an annoyance and when changing clothes or uniforms, such loosely held spares may be forgotten.

It is, therefore, an object of the present invention to provide a device for holding and storing a spare battery in conjunction with the specific electronic device which is being used.

It is a further object of the present invention to provide a spare battery holder which is small, lightweight, and which is itself removably attached to the appliance being used.

The foregoing objects together with additional objects and advantages will be apparent from the following disclosure of the present invention.

SUMMARY OF THE INVENTION

According to the present invention, a spare battery holder for a battery operated device is provided comprising a clip of a spring-construction material adapted to engage over the exterior of the electronic device. A battery holder, attached to the clip is provided with upper and lower lateral extensions having gripping means thereon in facing relationship to each other at a distance approximating the longitudinal size of the battery. One of the lateral extensions is provided with a small diameter hole adapted to receive the positive electrical anode contact of the battery while the opposite lateral extension is provided with a spring adapted to bear against the flat negative electrical cathode. The spare battery may then be compressed between the two lateral extensions and removably held therein under sufficiently strong bias so that it cannot be dislodged therefrom or under conditions which might cause damage to the battery itself.

Preferably, the spring clip is of a U-shaped construction material which can snap over and be held firmly in place on the housing of the electronic device while the holder is a shape of a rectilinear boat-like parallelepiped open on one of its long sides into which the spare battery may be easily inserted and easily grasped for removal.

The present invention is particularly adapted for use with small pen-like batteries of the A-type and AA-type and other miniature sizes, although it may be equally adaptable for use with even larger C-type and D-type batteries.

Full details of the present invention are set forth in the following description and are illustrated in the accompanying drawings.

DESCRIPTION OF THE INVENTION

Figures 1, 2:
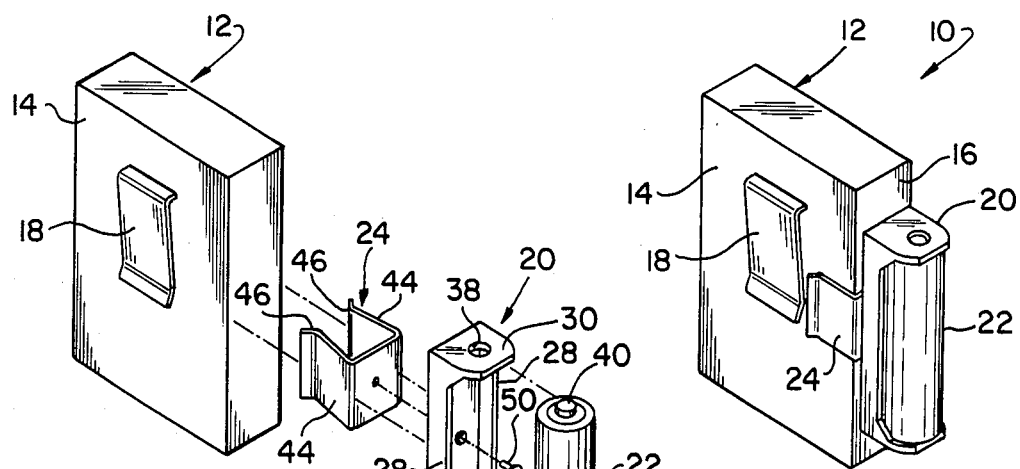
FIG. 1 is an exploded perspective view of the spare battery holder of the present invention showing the electronic device to which it may be attached, as well as the battery.
FIG. 2 is a perspective view showing the battery holder assembled to the electronic device and including the battery.
Figures 3, 6:
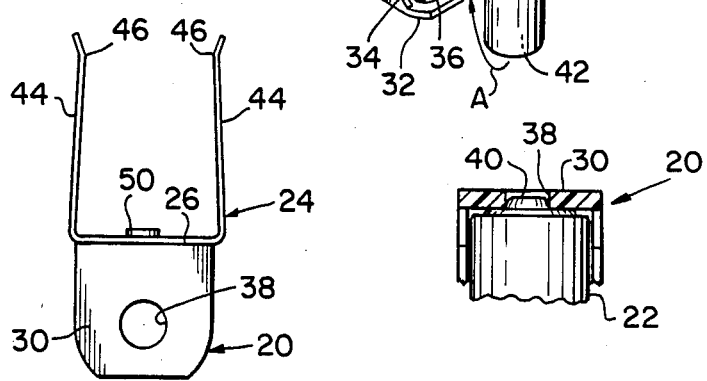
FIG. 3 is a plan view of the spare battery holder of the present invention.
FIG. 6 is an enlarged sectional view taken along line 6—6 of FIG. 5.
Figure 4:
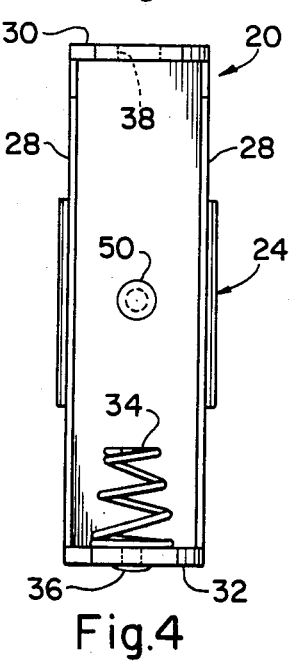
FIG. 4 is a front elevational view of the spare battery holder of the present invention.
Figure 5:
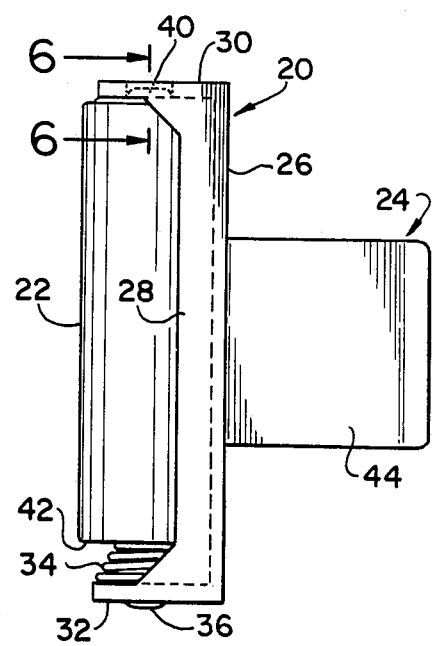
FIG. 5 is a right side elevational view of the spare battery holder of the present invention.

The spare battery holder, generally designated by the numeral 10, is shown in the drawing as applied to a conventional electronic devices, such as a beeper, generally designated by the numeral 12. The beeper 12 is illustrative of the overall structure of pocket-size electronic devices and its internal details are not shown, sincey they are not relevant to the disclosure of the present invention. The beeper 12 is contained in a rectilinear parallelepiped housing 14 having flat rectangular front and back faces, and a narrow peripheral edge 16. The beeper illustrated is provided with a carrying clip 18 by which it may be attached to a pocket-flap, a belt or similar supporting member. In many devices this carrying clip is omitted, and may be replaced with a belt, strap or the like. The beeper, as shown, is merely represented as a type of appliance to which the present invention may be adopted and should not be taken as limiting the scope of the present invention.

As seen, the spare battery holder 10 comprises in combination a receptacle 20 adapted to hold a battery 22 and a spring clip 24 by which the holder 10 may be releasably retained over the narrow peripheral edge 16 of the beeper 12.

The receptacle 20 of the spare battery holder 10 is preferably formed of a plastic material or other nonconductive material, in the shape of a rectilinear boat-like parallelepiped, having a flat rear wall 26, a pair of side walls 28 and opposing top and bottom laterally extending end walls 30 and 32. The receptacle 20 is absent a front wall to permit entry of the battery 22 in the direction shown by arrow A. The side walls 28 are spaced from each other approximately equal to the diameter of the battery 22 and are reduced in size so as to permit a larger circumferential surface of the battery 22 to be exposed and thus easily grasped by the user. On the otherhand, the walls may be shaped to have a circumferential tabs, at least in part overlying the battery, to more securely hold the battery. The end walls 30 and 32 are spaced apart a distance, along the major axis of the receptacle 20, slightly larger than the battery itself.

Thus, the overall dimensions of the receptacle 20 are only slightly larger than that of the battery 22 which is accommodated therein.

A helical coil spring 34, is fastened as with a rivet or similar means 36 to the bottom end wall 32 and extends resiliently along the major axis of the receptacle 20. Opposite the spring 34 in the top end wall 30, there is provided a hole 38. The hole 38 is substantially the size of the anode terminal 40 of the battery 22 so as to permit the anode terminal 40 to fit into the hole 38. As is well known, the cathode terminal 42 is substantially flat and is adapted to be placed over the free end of the helical coil spring 34.

The clip 24 is formed of a one piece unitary metal band to have a U-shaped configuration in which its arms 44 are inwardly bent by a slight amount toward each other so that they are spaced from each other slightly less than the transverse dimension of the peripheral edges 16 of the housing to which they might be attached. The arms 44 are bent outwardly at their extreme ends 46 to provide a cam-like surface permitting the easy placement of the clip 24 over the electronic appliance 12. The arms 44 are further joined by a flat connecting web having a transverse dimension substantially equal to that of the rear wall 26 of the receptacle 20. The clip 24 is secured intermediate the lateral ends of the receptacle 20, to the exposed surface of the rear wall 26 by a rivet or similar fastening means 50.

The spare battery holder 10 of the present invention is provided as a single unit comprising the receptacle 20 and the clip 24. Batteries may or may not be included with the housing as an intial marketing feature.

In any event, in use, a battery 22 is inserted between the lateral ends 30 and 32 of the receptacle 20, and the thus assembled unit is clipped onto the electronic beeper 12 by placing the clip over the peripheral edge 16. The arms 44 of the clip are placed inwardly over the housing 14, as far as possible so that as a result of the inward pressure of the spaced arms 44, a strong resilient and yet removable attachment is made between the spare battery holder 24 and the housing 1.

The spare battery is thus securely held in the holder 10, in conjunction with the electronic device, in which it will be ultimately used.

Various modifications of the spare battery holder of the present invention may be made to accommodate the same to different sized batteries. In addition, the clip 24 may be modified in its shape or form. These changes as well as others, will be readily apparent to those skilled in this art. Accordingly, the present disclosure is to be taken as illustrative only and not limiting the scope of the present invention.

What is claimed is:

1. A spare battery holder for a battery operated device of the type enclosed in a rectangular housing, said holder comprising a U-shaped clip of springy construction material adapted to be placed in engaged relation about a side of said rectangular housing, an open battery receptacle attached to said clip so as to extend longitudinally of said rectangular housing and provided with upper and lower lateral extensions having battery gripping means thereon in facing relation to each other spaced apart a distance approximating the longitudinal size of a spare battery to be placed in said receptacle, said spare battery being of the type having a positive electrical contact in the form of a small diameter projection extending from one end and a negative electrical contact in the form of a flat surface defining its opposite end, said battery gripping means on said one lateral extension for said spare battery positive electrical contact being a small diameter opening sized to receive in seated relation therein said battery projection and on said other lateral extension for said spare battery negative electrical contact an attached helical spring adapted to assume a compressed interposed position between said lateral extension and said battery flat surface, whereby said spare battery is removably held under spring urgency in said receptacle similar to the manner in which it is used during powering service and thus under conditions unlikely to cause damage to said battery.

2. The spare battery holder according to claim 1, wherein said U-shaped clip is formed of a single piece of resilient metal band.

3. The spare battery holder according to claim 2, wherein said metal band is formed with tabs at its end having cam surfaces adapted to snap over the edge of said elongated housing.

4. The spare battery holder according to claim 1, wherein said battery receptacle is formed of non-conductive material in the shape of a rectilinear boat-like parallelepiped, wherein the ends form the lateral extensions between which said battery is held and having an open side for introduction and removal of said battery.

* * * * *